United States Patent
Nandi et al.

(10) Patent No.: US 10,182,149 B2
(45) Date of Patent: Jan. 15, 2019

(54) METHOD AND APPARATUS TO PROMOTE ADOPTION OF AN AUTOMATED COMMUNICATION CHANNEL

(71) Applicant: AT&T Intellectual Property I, L.P., Atlanta, GA (US)

(72) Inventors: Prabir Nandi, Duluth, GA (US); Sanjeev Devarapalli, Dunwoody, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/933,669

(22) Filed: Nov. 5, 2015

(65) Prior Publication Data
US 2017/0134570 A1     May 11, 2017

(51) Int. Cl.
*H04M 3/493*    (2006.01)
*H04M 3/527*    (2006.01)
*H04M 3/51*     (2006.01)

(52) U.S. Cl.
CPC .............. *H04M 3/493* (2013.01); *H04M 3/51* (2013.01); *H04M 3/527* (2013.01)

(58) Field of Classification Search
CPC ........ H04M 3/527; H04M 3/493; H04M 3/51; G06Q 30/02
See application file for complete search history.

(56) References Cited

U.S. PATENT DOCUMENTS

| | | | |
|---|---|---|---|
| 6,240,391 B1 * | 5/2001 | Ball ...................... | H04M 3/493 379/93.24 |
| 8,036,347 B1 * | 10/2011 | Kanade ............... | H04M 3/5166 379/16 |
| 8,438,089 B1 * | 5/2013 | Wasserblat ............ | G06Q 40/02 704/270 |
| 8,472,612 B1 * | 6/2013 | Goringe ............ | H04M 3/42187 379/265.01 |
| 8,565,411 B2 | 10/2013 | Kannan et al. | |
| 9,055,148 B2 | 6/2015 | Sri et al. | |
| 9,092,801 B2 | 7/2015 | Chang et al. | |
| 2004/0249650 A1 * | 12/2004 | Freedman .............. | G06Q 30/02 705/7.29 |
| 2006/0122840 A1 * | 6/2006 | Anderson ............. | G10L 13/033 704/275 |
| 2007/0165808 A1 * | 7/2007 | Pieraccini ............... | H04M 3/51 379/142.04 |

(Continued)

OTHER PUBLICATIONS

Grønholdt, Lars, et al. Customer experience management and business performance. *International Journal of Quality and Service Sciences* 7.1 (2015): 90-106.

(Continued)

*Primary Examiner* — Lisa Hashem (57) ABSTRACT

A method, non-transitory computer-readable storage device, and apparatus for promoting adoption of an automated communication channel. For example, the method collects data from a plurality of communication channels related to a plurality of touchpoints, determines at least one journey from the plurality of touchpoints, determines a current state of a user for the at least one journey, determines that a next touchpoint for the at least one journey leads to a human interaction from the current state, and interacts with an endpoint device of the user via an automated communication channel.

20 Claims, 3 Drawing Sheets

(56) References Cited

U.S. PATENT DOCUMENTS

| | | | |
|---|---|---|---|
| 2007/0198368 A1* | 8/2007 | Kannan | G06Q 10/0631 |
| | | | 705/26.41 |
| 2008/0052377 A1* | 2/2008 | Light | G06Q 10/107 |
| | | | 709/218 |
| 2009/0003579 A1* | 1/2009 | Singh | H04M 3/4938 |
| | | | 379/211.01 |
| 2009/0299784 A1* | 12/2009 | Guller | G06Q 20/10 |
| | | | 705/39 |
| 2010/0158236 A1* | 6/2010 | Chang | H04M 3/5175 |
| | | | 379/265.03 |
| 2010/0278318 A1* | 11/2010 | Flockhart | G10L 17/26 |
| | | | 379/88.04 |
| 2011/0206198 A1* | 8/2011 | Freedman | G06Q 30/06 |
| | | | 379/265.03 |
| 2012/0265800 A1* | 10/2012 | Tuchman | H04M 3/51 |
| | | | 709/203 |
| 2013/0080362 A1 | 3/2013 | Chang et al. | |
| 2013/0159054 A1 | 6/2013 | Evans et al. | |
| 2013/0268468 A1 | 10/2013 | Vijayaraghavan et al. | |
| 2013/0282430 A1 | 10/2013 | Kannan et al. | |
| 2013/0343534 A1* | 12/2013 | Nguyen | H04M 3/5191 |
| | | | 379/265.09 |
| 2014/0006293 A1 | 1/2014 | Chang et al. | |
| 2014/0079195 A1 | 3/2014 | Srivastava et al. | |
| 2014/0207518 A1 | 7/2014 | Kannan et al. | |
| 2014/0314215 A1* | 10/2014 | Duva | G06Q 30/0202 |
| | | | 379/88.01 |
| 2015/0071418 A1* | 3/2015 | Shaffer | H04M 3/493 |
| | | | 379/88.01 |
| 2015/0220619 A1* | 8/2015 | Gray | G06F 17/30598 |
| | | | 707/738 |
| 2015/0379562 A1* | 12/2015 | Spievak | G06Q 30/0246 |
| | | | 379/265.09 |
| 2016/0078456 A1* | 3/2016 | Chakraborty | G06Q 30/0202 |
| | | | 705/7.31 |
| 2016/0080567 A1* | 3/2016 | Hooshiari | H04M 3/493 |
| | | | 379/88.01 |
| 2017/0064083 A1* | 3/2017 | Gilbert | H04M 3/5141 |
| 2017/0223065 A1* | 8/2017 | Fan | H04L 65/1069 |
| | | | 709/228 |
| 2018/0084111 A1* | 3/2018 | Pirat | H04M 3/5183 |
| 2018/0103149 A1* | 4/2018 | Skiba | H04L 51/02 |

OTHER PUBLICATIONS

Halvorsrud, Ragnhild, et al. "Components of a visual language for service design." *Proc. ServDes 2014* (2014): 291-300.

Wali, Andy Fred, et al. "Customer Relationship Management and Service Quality: a qualitative study." (2015).

Mangiaracina, Riccardo, Gianluca Brugnoli, and Alessandro Perego. "The eCommerce Customer Journey: A Model to Assess and Compare the User Experience of the e Commerce Websites." *Journal of Internet Banking and commerce* 14.3 (2009): 1-11.

\* cited by examiner

METHOD AND APPARATUS TO PROMOTE ADOPTION OF AN AUTOMATED COMMUNICATION CHANNEL

The present disclosure relates generally to a method and apparatus to promote adoption of a automated communication channel, e.g., using a mobile application, using a website to perform a transaction, using an Interactive Voice Response (IVR) system, and the like, by a user.

BACKGROUND

A user may interact with a service provider via a number of different communication channels, e.g., calling the service provider using a telephone, interacting with a website of the service provider, interacting with an IVR system of the service provider. The communication channel selected by an individual user is often based on the comfort level of the user in using certain communication channels and/or the complexity of the transactions or issues that are involved.

SUMMARY OF THE DISCLOSURE

In one embodiment, the present disclosure describes a method, non-transitory computer-readable storage device, and apparatus for promoting adoption of an automated communication channel. For example, the method collects data from a plurality of communication channels related to a plurality of touchpoints, determines at least one journey from the plurality of touchpoints, determines a current state of a user for the at least one journey, determines that a next touchpoint for the at least one journey leads to a human interaction from the current state, and interacts with an endpoint device of the user via an automated communication channel.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly describes a method, non-transitory computer-readable storage device, and apparatus for promoting adoption of a automated communication channel, e.g., using a mobile application, using a website to perform a transaction, using an Interactive Voice Response (IVR) system, using a messaging service (e.g., an email or a text message) and the like. Broadly, the automated communication channel encompasses any communication modality that does not require a real time interaction with a live person, individual or agent, e.g., a live customer care agent. In other words, a real time interaction with a live agent includes speaking with a live person via a phone call or an online chat.

With the proliferation of many sophisticated automated communication channels, many service providers have reduced the number of customer care agents who are employed at customer care centers. Such reductions are necessary to allow the service provider to gain efficiency, e.g., to reduce the overall cost of providing various services to the customers. However, such cost savings may impact the level of customer care services that the service provider is able to provide to its customers. For example, with a reduced staff of live customer case agents, a service provider may rely on the customers interacting with the many sophisticated automated communication channels to implement transactions and/or to report and resolve possible technical issues specific to the customers. However, some customers may be unwilling to engage these automated communication channels due to personal preferences, lack of technical ability to use these automated communication channels, and/or lack of confidence that such automated communication channels will produce the desired results. Irrespective of the reasons, it is beneficial to promote the adoption of automated communication channels by a customer since such automated communication channels are often available 24 hours a day and are often able to address a customer's issue immediately. Furthermore, the cost associated with the deployment and maintenance of these automated communication channels by the service provider is considerably less than the deployment of live agents in one or more customer care centers. The live agents are often limited in terms of number and the time in which such live agents are available to assist customers. Thus, a customer may be dissatisfied with having to wait a long period of time on the phone to speak with a live agent or is frustrated with having to speak with a live agent only during business hours when such live agents are actively on duty.

It is often the case that the automated communication channels are readily available and are able to address the customer's issues or perform a transaction required by the customer. For example, if the service provider is a network service provider that is providing communication services (e.g., local and/or long distance telephony services, cellular services, email messaging services, text messaging services and the like), data services (e.g., file transferring services, Internet access services and the like), and/or multimedia services (e.g., multimedia content delivery services such as delivering movies, videos, songs, and the like), then the customer may have to perform a transaction and/or have an inquiry pertaining to one of the provided services. Such transactions and/or inquiries can often be resolved through automated communication channels without the need to interact with a live agent.

To illustrate, a customer may be traveling out of the country and is attempting to subscribe to an international traveling plan with respect to having a cellular service, a data service and a text messaging service while traveling outside of the country. Such subscription can be handled by a live agent who is contacted by the customer to setup the international traveling plan for a time period selected by the customer. The customer may call a toll free number of the network service provider to speak with a live agent who will setup the international traveling plan for the customer. However, the network service provider may already have a website where such international traveling plan can be automatically subscribed to by any customers without the need to interact with any live agents. In fact, it is often the case that the customer is able to subscribe to such services online faster and with less wasted time than speaking with a live agent.

In another example, a customer may be having a technical issue with a service, e.g., the access speed to the Internet may be an issue. Under this example, a customer may call the network service provider to inquire and/or to complain that the access to the Internet is problematic. In turn, the live agent may have the customer execute a series of tests that will diagnose the potential speed issue raised by the customer. Again, the network service provider may already have a website where such series of tests can be readily accessed by any customers without the need to interact with any live agents. In fact, it is often the case that the customer is able to run these tests online faster and with less wasted time than speaking with a live agent.

In yet another example, a customer may have an issue with a billing issue, e.g., an itemized charge on the bill. Under this example, a customer may call the network service provider to inquire and/or to complain that the itemized charge on the bill may be an error. In turn, the live agent may have the customer specify which itemized charge on the bill is the issue and then provide an explanation as to why the itemized charge on the bill is incurred. Again, the network service provider may already have a website where a comprehensive billing system that can be readily accessed by any customers without the need to interact with any live agents. The billing system may clearly show each itemized charge with a detailed explanation of the incurred charge and allow a customer to investigate each charge online. In other words, supporting documentations can be readily made available online for the customer. Thus, it is often the case that the customer is able to access the billing system online faster and with less wasted time than speaking with a live agent.

However, the unwillingness of a customer to adopt such automated communication channels increases the cost of the network service provider and results in dissatisfaction with the customer having to wait a long period of time before a live agent is made available. Thus, it is beneficial that the customer is encouraged to adopt the use of automated communication channels. However, it is noted that by the time the customer is reaching out to the network service provider via a non-automated communication channels, it would be too late to persuade the customer to use one of the other automated communication channels. In other words, once the customer decides to call the network service provider, it is already too late to persuade the customer to use one of the other automated communication channels. Thus, one aspect of the present disclosure is to determine the state of a current "journey" that the customer is on and to persuade the customer to adopt one of the automated communication channels based on the current state.

To illustrate, a "journey" comprises a series of "touchpoints" between the customer and the service provider. For example, a touchpoint is broadly an interaction between the customer and the service provider. For example, various types of touchpoints may exist, e.g., a marketing touchpoint, an acquisition touchpoint or a use touchpoint. A marketing touchpoint comprises an interaction (e.g., via a non-automated communication or an automated communication channel) pertaining to a marketing event. For example, a marketing touchpoint may comprise a customer visiting a service provider's website to view a marketing offer, a customer calling a service provider to inquire about a new service, a service provider sending an email to the customer offering a new service, a service provider calling the customer to offer a new service, a service provider sending a text message, e.g., an Short Message Service (SMS) message, to the customer with a new offer, and the like.

In another example, an acquisition touchpoint comprises an interaction (e.g., via a non-automated communication or an automated communication channel) pertaining to the acquisition of a service. For example, an acquisition touchpoint may comprise a customer visiting a service provider's website to order a service, a customer calling a service provider to order a new service, a service provider sending an email to the customer indicating a date and time when a technician will arrive at the customer's premises to install the new service, a service provider calling the customer to request a time to install the new service, a service provider sending a text message, e.g., an SMS message, to the customer that the new service is now operating, and the like.

In another example, a use touchpoint comprises an interaction (e.g., via a non-automated communication or an automated communication channel) pertaining to the use of a service. For example, a use touchpoint may comprise a customer visiting a service provider's website to view usage parameters relating to a service (e.g., minutes used, cost incurred, and the like), a customer calling a service provider to inquire about the speed of a service, a service provider sending an email to the customer indicating a failure relating to the service that will impact the customer, a service provider calling the customer to fix a piece of equipment relating to an existing service subscribed by the customer, a service provider sending a text message, e.g., an SMS message, to the customer that a current bill for an existing service is overdue, and the like.

In turn, a "journey" traversed by a customer may involve any number of the above described touchpoints. For example, an illustrative journey may involve: 1) the service provider sending an email offer to the customer, 2) responsive to the email offer, the customer visits a website of the service provider, 3) the customer then calls a live agent of the service provider to ask various service related questions, 4) the customer then subscribes to the service using an IVR system of the service provider, 5) the service provider sends a text message to the customer indicating that the service is now provisioned and activated, and 6) the customer reviews a bill online for the newly installed service. In another example, an illustrative journey may involve: 1) the service provider sending an email notice to the customer of an increase in the cost of an existing service, 2) responsive to the increase, the customer visits a website of the service provider, 3) the customer then calls a live agent of the service provider to ask various cost related questions, and 4) the customer then terminates the service using an IVR system of the service provider. In yet another example, an illustrative journey may involve: 1) the service provider sending an email notice to the customer of an opportunity to upgrade an existing service, 2) responsive to the opportunity, the customer visits a website of the service provider, 3) the customer then calls a live agent of the service provider to ask various related questions for the opportunity, 4) the customer then accepts the opportunity for upgrading the existing service on a website of the service provider, 5) the service provider sends a new piece of equipment to the customer via a mail service, 6) the customer activates the newly received equipment and connects to a network of the service provider, 7) the service provider's network detects the newly deployed equipment at the customer's premises and configure the newly deployed equipment remotely, and 8) the service provider sends a text message that the upgraded service has been provisioned and is now activated.

It should be noted that the above described journeys and touchpoints are only illustrative and should not be interpreted as limitations to the present disclosure. It should be noted that each journey may comprise any number of non-automated communication interactions and any number of automated communication interactions between the customer and the service provider. In fact, the "goal" or "intent" of a journey can be achieved via different paths with different starting points or "triggers." Said another way, the "end" or "destination" of a journey can be arrived through different touchpoints. For example, if the goal of a journey is to activate a new service for a customer, then one path may involve a first customer calling the service provider (e.g., a type of start or trigger) to activate the new service, whereas another customer may visit a website (e.g., another type of start or trigger) of the same service provider to activate the new service. Thus, both journeys of these two illustrative customers arrived at the same destination, but the journeys taken by these two customers are different.

Thus, journeys may encompass any number of goals and intents. For example, journeys may comprise: a billing journey (e.g., a journey that ends in a billing function being performed, e.g., sending a billing, removing a charge, providing an explanation for a billed charge, and the like), an order journey (e.g., a journey that ends in an ordering function being performed, e.g., ordering a service, ordering new equipment to be sent to the customer, upgrading an existing service, adding a feature to an existing service and the like), a service journey (e.g., a journey that ends in a service being performed, e.g., performing a diagnostic test (e.g., a test for reporting low video quality, broadband quality issues, and the like), sending a signal to a customer device (e.g., Residential Gateway (RG) Reachability tests can be used to determine connectivity to the customer premises or customer equipment), sending a technician to perform an onsite test, and the like).

One aspect of the present disclosure is to promote the adoption of an automated communication interaction for a touchpoint when a customer is on a particular journey. To illustrate, the service provider may have a large body of historical data that will indicate the series of touchpoints that may lead to a destination of a journey. Consider a "new offer" example, where a first journey may comprise: 1) a user visiting a website of a service provider to review an offer, 2) the user calling the service provider to speak to a live agent to inquire about the offer, and 3) the user calling back the service provider at a future time to subscribe to the offer. A second journey with the same destination, may comprise: 1) a user may visit a website of a service provider to review an offer, 2) the user may call the service provider to speak to a live agent to inquire about the offer, and 3) the user may subscribe to the offer via the website. Both journeys end at the same destination, i.e., both users end up subscribing to the same offer. However, the cost to the service provider is substantially higher for the first journey, and the user in the first journey may have to wait a substantial amount of time to speak to a live agent before the offer is subscribed by the user. In contrast, the cost to the service provider is substantially lower for the second journey due the avoidance of a second interaction with a live agent, and the user may not have to wait a substantial amount of time to speak to a live agent before the offer is subscribed by the user. In fact, the user in the second journey could have subscribed to the offer during non-business hours where no live agent is on duty, thereby leading to greater service satisfaction for the user.

One aspect of the present disclosure is to gather data from a plurality of touchpoint channels, e.g., telephone call records (e.g., call detail records (CDRs), website access data, email messages, text messages, and the like. These historical data can be collected and applied to a learning method for deducing one or more journeys. For example, data for each user can be analyzed across all communication channels for that particular user, e.g., based on the calling phone number of the user, social security number of the user or any other user identifier associated with the user. The analysis will attempt to match the user's various interactions to determine whether the various interactions will fit within one or more particular types of journey destinations. For example, destinations of a journey may comprise: 1) adoption of a new service, 2) adoption of an upgrade to an existing service, 3) termination of an existing service, 4) downgrade of an existing service, 5) request for a replacement equipment, 6) request for a technician to arrive at a customer premises, 7) request to speak to a customer care agent, 8) request to speak to a supervisor customer care agent, 9) posting of a negative comment on a website of the service provider, and so on. As the historical data is processed, one or more paths of various journeys will be uncovered by the automated learning processes. Different paths leading to the same destination of a journey will be identified and analyzed. In one embodiment, these paths are compared to identify touchpoints that involve non-automated communication channels. Alternative touchpoints in similar paths with the same destination that utilize automated communication channels will be determined. In one embodiment, a user on such path will be encouraged to adopt the automated communication channel.

Using the "new offer" example above, when a user has reached the second touchpoint of speaking to a live agent with respect to the new offer, the present disclosure will attempt to channel the user to the second journey instead of the first journey. For example, the service provider may proactively send a notification, e.g., an email, to the user with an embedded link to a particular part of the service provider's website to sign the user up for the new offer, e.g., a part of the website where the user's information has already been populated so that the user can more easily sign up for the new offer. In other words, given the current state of the user for a particular journey, the service provider is preempting the user from calling the service provider back as shown in the first journey. This preempting step is performed in an automated manner and is determined from the analysis performed on the historical data pertaining to the plurality of touchpoint channels. In other words, the learning algorithms can be used to determine at what point a user can be best persuaded to use an automated communication channel instead of a non-automated communication channel for a particular journey.

For example, the machine learning algorithm may comprise a Gradient Boosted Decision Tree (GBDT) algorithm. However, any other algorithms for machine learning, e.g., a neural network algorithm, may be used.

Prior to being used to perform a prediction, the learning algorithm needs to be trained. For example, historical data associated with each type of destination of a journey can be gathered for a plurality of users, e.g., interaction data for each user that ended in the user porting out can be gathered and classified as porting out historical data. Similarly, interaction data for each user that ended in the user requesting a live agent supervisor can be gathered and classified as requesting for live agent supervisor historical data. Similarly, interaction data for each user that ended in the user adopting a preferred communication modality (e.g., an automated communication channel) can be gathered and classified as adopting a preferred communication modality historical data. Similarly, interaction data for each user that ended in the user subscribing to a new service can be gathered and classified as subscribing to a new service historical data. Thus, a large volume of user interactions can be classified and sorted into different sets of historical data sets that can be used as training sets for machine learning algorithms. In one example, each set of historical data can be divided such that one half of the historical data is used to train the machine learning algorithm and the remaining half of the historical data is used to test the machine learning algorithms to determine whether the machine learning algorithms are making the correct predictions.

In turn, once the machine learning algorithms are trained and tested, the machine learning algorithms are deployed to monitor the interactions of each user, e.g., monitoring for each user the interaction of the user with the service providers across a plurality of communication channels or modalities. In turn, the monitoring includes for deducing one or more journeys and determining at what point a user can be best persuaded to use an automated communication channel instead of a non-automated communication channel for a particular journey.

Figure 1:
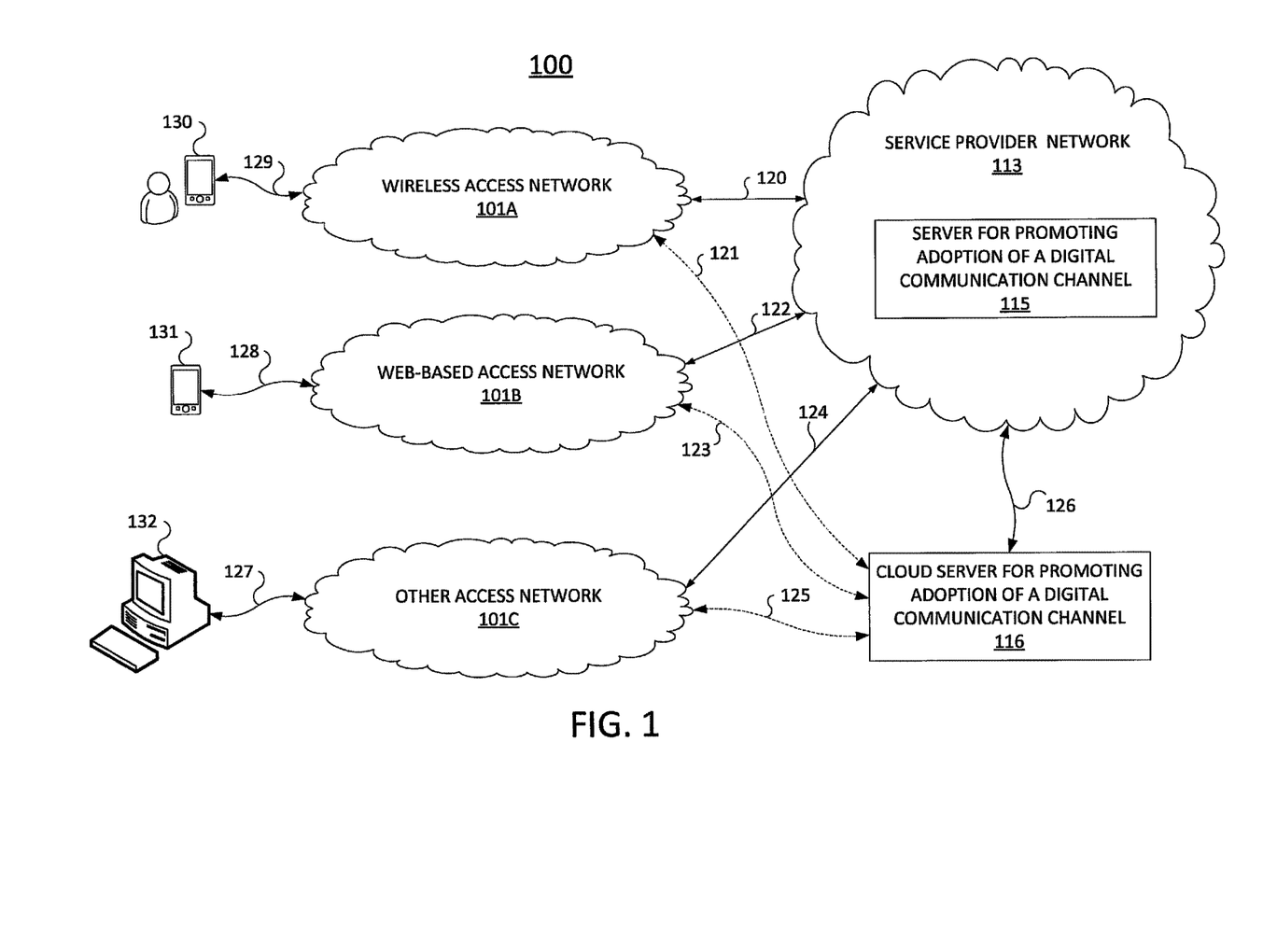
FIG. 1 illustrates an illustrative network related to the present disclosure.

FIG. 1 illustrates an exemplary network 100 related to the present disclosure. In one illustrative embodiment, the network 100 comprises a wireless access network 101a (e.g., a cellular access network, a wireless fidelity (Wi-Fi) access network and the like), a web-based access network 101b (e.g., an Internet-based access network), other access network 101c (e.g., a telephony access network, a Voice over Internet Protocol (VoIP) access network, and the like), and a core service provider network 113 (or broadly a core network). The wireless access network 101a may comprise any number of wireless access networks, e.g., Wi-Fi networks, 2G networks, 3G networks, LTE networks, satellite network, etc. The core network 113 may comprise any number of application servers, gateway devices, routers, switches, databases, firewalls etc. of a network service provider (not shown). For example, the core network 113 may comprise an application server 115 for promoting the adoption of an automated communication channel for a journey by a user, e.g., a dedicated database server can be deployed to monitor users' interaction with a service provider for promoting the adoption of an automated communication channel for a journey by a user. The core network 113 may also be communicatively coupled to one or more cloud servers 116. The method of the present disclosure may be implemented in a server of a service provider network, e.g., server 115, or a cloud server, e.g., server 116, of the present disclosure. The access networks 101a-101c communicate with application servers 115 and/or 116 via various types of communication channels 120-126.

Although the teachings of the present disclosure are discussed below in the context of a core network, the teaching is not so limited. Namely, the teachings of the present disclosure can be applied in any types of wireless networks (e.g., 2G network, 3G network, a long term evolution (LTE) network, and the like) or any types of wire based networks (e.g., public switched telephone network, Internet Protocol (IP) networks, cable networks, etc.), wherein promoting the adoption of a automated communication channel by a user, is beneficial.

FIG. 1 also illustrates various user endpoint devices 130-132. The user endpoint devices 130-131 access services via the wireless access network 101a or the web-based access network 101b via various types of communication channels 128-129. The user endpoint device 132 accesses services via the other access network 101c (e.g., a fiber optic network, a cable network, etc.) via various types of communication channels 127. It should be noted that the network 100 is only illustrative and the number of network components or elements are not specifically limited as shown. Any number of network elements and components can be deployed. For example, there may be several wireless networks, several wire based access networks, several different core networks, several cloud servers, and the like. In addition, any number of network elements may be deployed in each of the networks.

Figure 2:
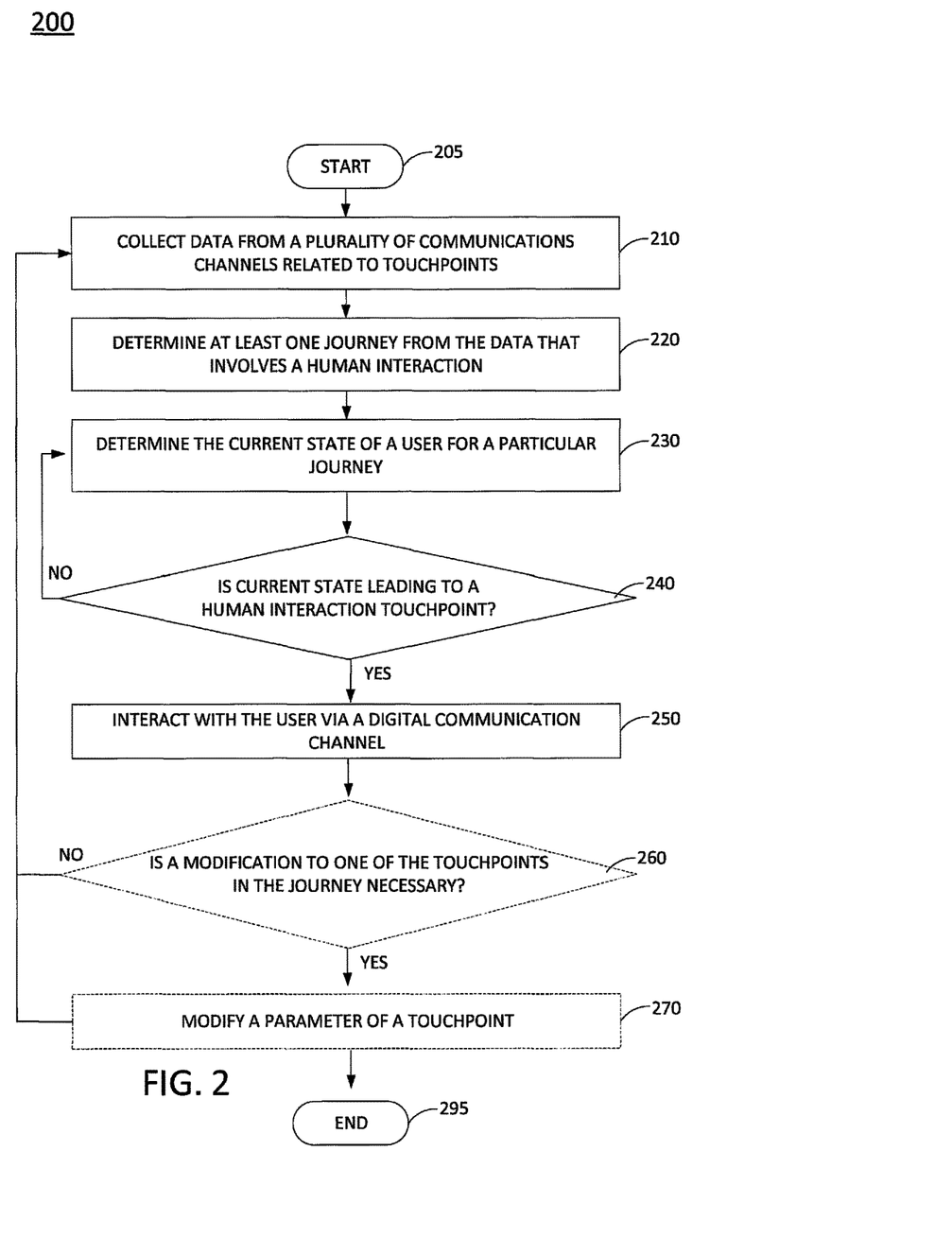
FIG. 2 illustrates an example method of the present disclosure for promoting adoption of a automated communication channel.

FIG. 2 illustrates a flowchart of a method 200 of the present disclosure for promoting the adoption of an automated communication channel for a journey by a user. For example, the method may be implemented in a dedicated server, e.g., an application server of a network service provider, a cloud server, etc. Method 200 starts in step 205 and proceeds to step 210.

In step 210, method 200 collects data from a plurality of communication channels related to touchpoints. For example, method 200 collects historical data from a plurality of different communication channels (e.g., automated communication channels and non-automated communication channels) for a plurality of different touchpoints.

In step 220, method 200 determines at least one journey (e.g., one or more journeys) from the collected data. For example, the method 200 may employ a learning algorithm or a neural network to learn a plurality of possible journeys. In fact, different paths leading to the same journey destinations are noted as are the number of touchpoints of each possible path including the number of touchpoints comprising automated communication channels versus the number of touchpoints comprising non-automated communication channels.

In step 230, method 200 determines a current state of a user for a particular journey. Said another way, the method determines which touchpoint the user has just reached or has completed. This will allow the method 200 to determine which is the next likely touchpoint for this particular user.

In step 240, method 200 determines whether the current state of the user in the particular journey will likely lead to a human interaction touchpoint. For example, method 200 may determine whether the user will likely contact the service provider to speak to a live agent of the service provider in the near future. For example, using the "new offer" example as discussed above, the analysis may indicate that within 3 days of speaking to a live agent concerning various features of the new offer, a user may likely call the service provider again to subscribe to the new offer. If the query in step 240 is answered positively, the method proceeds to step 250. If the query in step 240 is answered negatively, the method 200 returns to step 230 to continue monitoring the state of the user as to the user's current journey.

In step 250, method 200 interacts with the user (e.g., sending a notification to an endpoint device of a user, e.g., a mobile phone, a smart phone, a computer, a computing tablet, a laptop, and the like) via an automated communication channel to promote the adoption of a automated communication channel for at least one of the upcoming touchpoints within a journey. For example, the dedicated server 115 or 116 of the service provider may automatically send to an endpoint device of the user via an email or a text message within the 3 day time period inviting the user to click on an embedded link that will provision or activate the new offer, thereby preempting the user from calling the service provider as shown in the first journey. This automated communication with the user is intended to promote adoption of the automated communication channel for a next touchpoint. The email or text message may include an extra incentive that is only available through activation of the new offer via an automated communication channel. In other words, the user will not receive the additional incentive if the user were to contact the service provider via a telephone call interacting with a live agent. The additional incentive may comprise a lower price for the new offer, an additional feature that is accessible via the new offer, a credit that can be applied to other services, and the like.

In optional step 260, method 200 determines whether a modification is needed for one of the touchpoints in the journey. For example, the analysis may indicate that users interacting with a particular call center results in a higher percentage of these users calling back to the service provider requesting to speak to yet another agent. This higher percentage can be deduced from comparing other journeys for other users who may have interacted with a different call center. In other words, the present analysis is not just limited to determining the current state of a user for a journey. In one embodiment, the present disclosure may continuously monitor the effectiveness of various paths of one or more journeys to determine whether an optimization can be performed to enhance the overall adoption of automated communication channels in as many touchpoints as possible. For example, customer care agents in one call center may not be effective in addressing the users' concerns where the users are calling back to speak to a supervisor agent. In another example, customer care agents in one call center may not be effective in addressing a technical problem such the users may need to call back to request another solution to a technical problem that was not solved in an earlier call with an agent. Such repeated telephone inquiries are costly to the service provider. In another example, customer care agents in one call center may have a disproportionate percentage of calls ending in the dispatch of a technician to the customer premises. Such dispatches of personnel to perform onsite trouble shooting are very costly to the service provider and should be reserved for the most difficult issues that cannot be solved using other automated or non-automated communication channels. If the query in step 260 is answered positively, the method proceeds to step 270. If the query in step 260 is answered negatively, the method returns to step 210 to continue to collect data.

In optional step 270, a parameter of a touchpoint is changed or modified. For example, customer care agents in the call center that has a disproportionate percentage of calls ending in the dispatch of a technician to the customer premises may be prohibited from placing such dispatches unless approved by a supervisor (broadly a parameter is modified to implement a prohibition operation). In another example, customer care agents in a particular call center may be required to undergo retraining for a particular technical issue to ensure that the customer care agents are provided with up-to-date solutions for a particular technical issue (broadly a parameter is modified to implement a training operation). In another example, calls initially for customer care agents in a particular call center may be rerouted to another call center where customer care agents in this other call center are particularly effective in addressing customer concerns such that a much lower percentage of the customers will call the customer care center again for the same technical issue (broadly a parameter is modified to implement a forwarding operation). Thus, any number of parameters can be changed in step 270 based on the analysis that may indicate a parameter of a touchpoint may need to be changed. The method 200 may return to step 210 to collect additional data or may simply end in step 295 depending on the requirements of a particular implementation.

It should be noted that the method 200 is described in view of a single user. However, the method is not so limited. The method can be implemented in parallel for a plurality of users.

It should be noted that although not explicitly specified, one or more steps, functions, or operations of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 2 that recite a determining operation, or involve a decision, do not necessarily require that both branches of the determining operation be practiced. In other words, one of the branches of the determining operation can be deemed as an optional step.

As such, the present disclosure provides at least one advancement in the technical field of automated customer service by promoting the adoption of an automated communication channel for a journey by a user. This advancement is in addition to the traditional interaction of users with the service provider. In other words, the present disclosure provides a dedicated application server 115 or 116 that is configured to perform the specific functions as discussed in FIG. 2 and is tasked with promoting the adoption of an automated communication channel for a journey by a user. Such adoption of an automated communication channel will reduce the overall cost of the network service provider and enhances the overall satisfaction of the customer.

The present disclosure also provides a transformation of customer interaction data. For example, historical customer interaction data is transformed into notification data that can be used to determine whether a communication should be preemptedly sent via an automated communication channel to encourage the user to communicate with the service provider via the automated communication channel.

Finally, embodiments of the present disclosure improve the functioning of a computing device, e.g., a dedicated customer care application server. Namely, a dedicated customer care application server is improved by utilizing historical customer interaction data to anticipate the need of the user and to provide the user with a predefined automated communication mechanism to communicate with the service provider.

Figure 3:
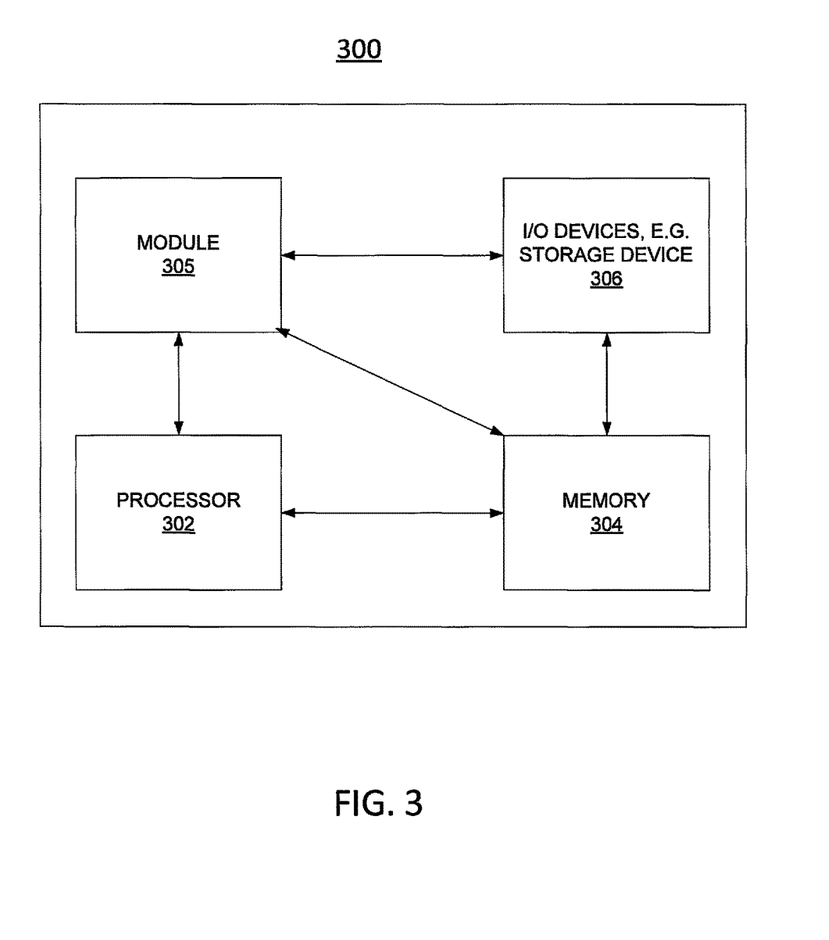
FIG. 3 depicts a high-level block diagram of a computer suitable for use in performing the functions described herein.

FIG. 3 depicts a high-level block diagram of a computer, e.g., a dedicated application server, suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 for promoting the adoption of a automated communication channel for a journey by a user, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method 200 as discussed above is implemented in a distributed or parallel manner for a particular illustrative example, i.e., the steps of the above method 200, or the entire method 200 is implemented across multiple or parallel computers, then the computer of this figure is intended to represent each of those multiple computers.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computer or any other hardware equivalents, e.g., computer readable instructions pertaining to the method(s) discussed above can be used to configure a hardware processor to perform the steps, functions and/or operations of the above disclosed method. In one embodiment, instructions and data for the present module or process 305 for promoting the adoption of a automated communication channel for a journey by a user (e.g., a software program comprising computer-executable instructions) can be loaded into memory 304 and executed by hardware processor element 302 to implement the steps, functions or operations as discussed above in connection with the exemplary method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for promoting the adoption of a automated communication channel for a journey by a user (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method comprising:
   collecting, by a processor, data from a plurality of communication channels related to a plurality of touchpoints of user interactions with a network service provider;
   determining, by the processor, at least one journey from the plurality of touchpoints, the at least one journey comprising a subset of the plurality of the touchpoints and a destination;
   determining, by the processor, a current state of a user for the at least one journey, the current state being a touchpoint of the at least one journey that the user has just reached or has completed;
   determining, by the processor, that a next touchpoint from the current state for the at least one journey leads to a human interaction, wherein the human interaction is an interaction between the user and a live agent of the network service provider; and
   interacting, by the processor, solely in response to the determining that the next touchpoint leads to the human interaction, with an endpoint device of the user via an automated communication channel as an alternative to the next touchpoint for the at least one journey that leads to the human interaction, wherein the interacting with the endpoint device of the user via the automated communication channel comprises a different touchpoint leading to the destination, wherein the automated communication channel does not require a real time interaction with the live agent, wherein the automated communication channel comprises: using a mobile application, using a website to perform a transaction, using an interactive voice response system, or using a messaging service.

2. The method of claim 1, wherein the processor is employed by the network service provider.

3. The method of claim 2, wherein the network service provider provides at least one of: a communication service, a data service, or a multimedia service.

4. The method of claim 1, further comprising:
   determining whether a modification is to be applied to one of the plurality of touchpoints.

5. The method of claim 4, further comprising:
   applying the modification to a parameter of the one of the plurality of touchpoints when the modification is determined to be applied.

6. The method of claim 5, wherein the modification comprises at least one of: a prohibition operation, a training operation or a forwarding operation.

7. The method of claim 1, wherein the at least one journey comprise at least one of: a billing journey, an order journey, or a service journey.

8. A non-transitory computer-readable storage device storing a plurality of instructions which, when executed by a processor, cause the processor to perform operations, the operations comprising:
   collecting data from a plurality of communication channels related to a plurality of touchpoints of user interactions with a network service provider;
   determining at least one journey from the plurality of touchpoints, the at least one journey comprising a subset of the plurality of the touchpoints and a destination;
   determining a current state of a user for the at least one journey, the current state being a touchpoint of the at least one journey that the user has just reached or has completed;

determining that a next touchpoint from the current state for the at least one journey leads to a human interaction, wherein the human interaction is an interaction between the user and a live agent of the network service provider; and interacting, in response solely to the determining that the next touchpoint leads to the human interaction, with an endpoint device of the user via an automated communication channel as an alternative to the next touchpoint for the at least one journey that leads to the human interaction, wherein the interacting with the endpoint device of the user via the automated communication channel comprises a different touchpoint leading to the destination, wherein the automated communication channel does not require a real time interaction with the live agent, wherein the automated communication channel comprises: using a mobile application, using a website to perform a transaction, using an interactive voice response system, or using a messaging service.

9. The non-transitory computer-readable storage device of claim 8, wherein the processor is employed by the network service provider.

10. The non-transitory computer-readable storage device of claim 9, wherein the network service provider provides at least one of: a communication service, a data service, or a multimedia service.

11. The non-transitory computer-readable storage device of claim 8, the operations further comprising:
determining whether a modification is to be applied to one of the plurality of touchpoints.

12. The non-transitory computer-readable storage device of claim 11, the operations further comprising:
applying the modification to a parameter of the one of the plurality of touchpoints when the modification is determined to be applied.

13. The non-transitory computer-readable storage device of claim 12, wherein the modification comprises at least one of: a prohibition operation, a training operation or a forwarding operation.

14. The non-transitory computer-readable storage device of claim 8, wherein the at least one journey comprises at least one of: a billing journey, an order journey, or a service journey.

15. An apparatus comprising:
a processor; and
a computer-readable storage device storing a plurality of instructions which, when executed by the processor, cause the processor to perform operations, the operations comprising:

collecting data from a plurality of communication channels related to a plurality of touchpoints of user interactions with a network service provider;

determining at least one journey from the plurality of touchpoints, the at least one journey comprising a subset of the plurality of the touchpoints and a destination;

determining a current state of a user for the at least one journey, the current state being a touchpoint of the at least one journey that the user has just reached or has completed;

determining that a next touchpoint from the current state for the at least one journey leads to a human interaction, wherein the human interaction is an interaction between the user and a live agent of the network service provider; and interacting, in response solely to the determining that the next touchpoint leads to the human interaction, with an endpoint device of the user via an automated communication channel as an alternative to the next touchpoint for the at least one journey that leads to the human interaction, wherein the interacting with the endpoint device of the user via the automated communication channel comprises a different touchpoint leading to the destination, wherein the automated communication channel does not require a real time interaction with the live agent, wherein the automated communication channel comprises: using a mobile application, using a website to perform a transaction, using an interactive voice response system, or using a messaging service.

16. The apparatus of claim 15, wherein the processor is employed by the network service provider.

17. The apparatus of claim 16, wherein the network service provider provides at least one of: a communication service, a data service, or a multimedia service.

18. The apparatus of claim 15, the operations further comprising:
determining whether a modification is to be applied to one of the plurality of touchpoints.

19. The apparatus of claim 18, the operations further comprising:
applying the modification to a parameter of the one of the plurality of touchpoints when the modification is determined to be applied.

20. The apparatus of claim 15, wherein the modification comprises at least one of: a prohibition operation, a training operation or a forwarding operation.

* * * * *